T. NORRIS & E. J. MARSHALL.
SHOVEL, SPADE, AND LIKE IMPLEMENT.
APPLICATION FILED FEB. 3, 1909.
933,333.
Patented Sept. 7, 1909.
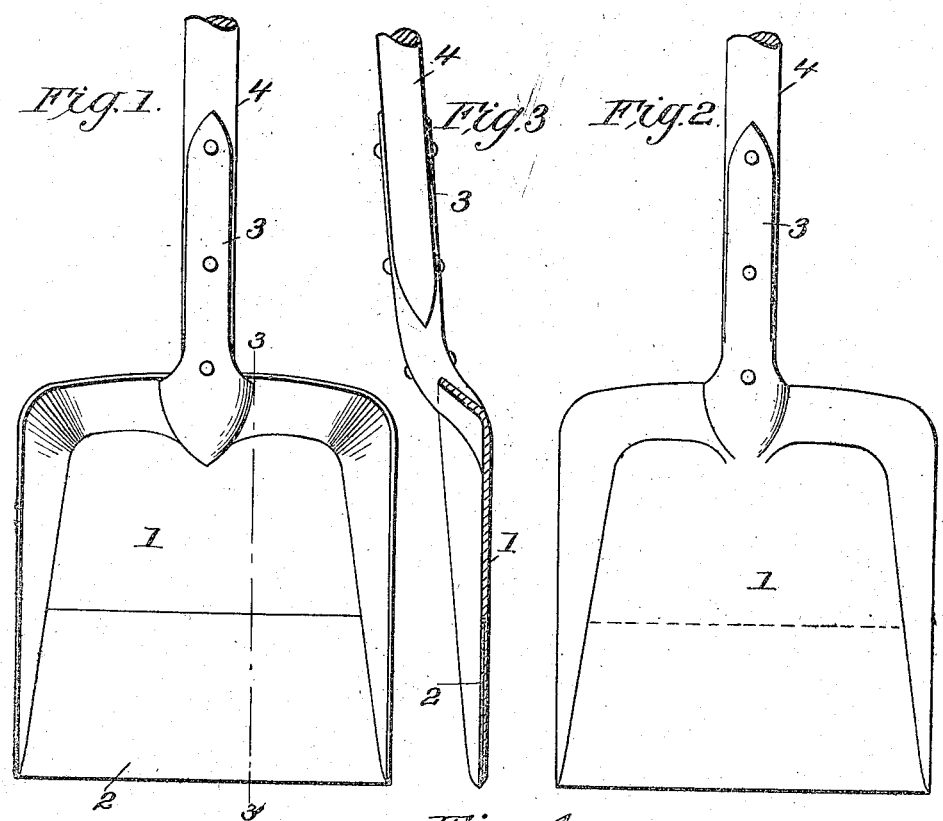
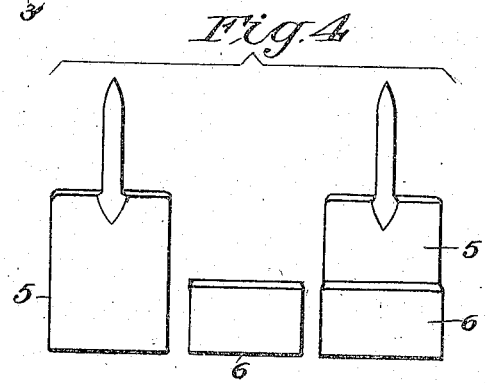

UNITED STATES PATENT OFFICE.

THOMAS NORRIS AND EDWARD J. MARSHALL, OF GADSDEN, ALABAMA, ASSIGNORS TO SOUTHERN SHOVEL MANUFACTURING COMPANY, OF GADSDEN, ALABAMA, A CORPORATION OF ALABAMA.

SHOVEL, SPADE, AND LIKE IMPLEMENT.

933,333.  Specification of Letters Patent.  Patented Sept. 7, 1909.

Application filed February 3, 1909.  Serial No. 475,819.

*To all whom it may concern:*

Be it known that we, THOMAS NORRIS and EDWARD J. MARSHALL, citizens of the United States, residing at Gadsden, in the county of Etowah and State of Alabama, have invented certain new and useful Improvements in Shovels, Spades, and Like Implements, of which the following is a specification.

This invention relates to improvements in shovels, spades and the like, and the process of making the same, and has for an object the production of an improved shovel, spade, or the like having a facing of hard metal secured to a backing of comparatively soft metal for continuously giving a substantially sharp edge at all times.

A further object in view is the provision of a shovel formed with a soft body and a hard edge that is welded thereto for forming a substantially integral shovel, but at the same time presenting a soft body and a hard face that presents a thin hard wearing edge at all times.

A still further object in view is the process of taking a blank of soft iron and a blank of high grade carbon steel and pressing the same together while heated for forming an integral shovel having a face of high grade steel that will take a hard temper and a comparatively soft body with a comparatively small amount of temper.

With these and other objects in view the invention comprises certain novel constructions, combinations and arrangement of parts as will be hereinafter more fully described and claimed.

In the accompanying drawings: Figure 1 is a front view of a shovel embodying the features of the invention. Fig. 2 is a rear view of the structure shown in Fig. 1. Fig. 3 is a section approximately on line 3—3 of Fig. 1. Fig. 4 is a plan view of a plurality of blocks arranged to show the steps of the process for forming the shovel shown in Fig. 1.

In the construction of shovels, spades and the like it is very desirable to have a shovel that will retain its edge and yet not crumble or break or crack during use or during hardening of the same. Various means have been provided in the attempt to construct a shovel that will retain a substantially sharp edge at all times, and yet not break or bend during use. It is to this class of implements that the present invention relates, one form of implement being shown in the accompanying drawing in which 1 indicates the body of a shovel and 2 a hard face plate of some good quality of steel. The body 1 is provided with a bifurcated projection or handle 3 of any desired kind to which a wooden handle 4 of any desired kind is secured. The handles 3 and 4 may be varied as occasion may require, and may be made of any desired material. The body 1 of the shovel is made from iron or soft steel and the face plate 2 is constructed of some good quality of steel, as for instance high carbon steel that will take a good temper. The body 1 of the shovel is pressed out into the desired shape, and during the process of pressing the face plate 2 is placed on the shovel and pressed at the same time so as to be formed substantially integral with the body 1 and yet retain its quality of high grade steel. After the shovel has been formed the face plate 2 may be tempered to the proper degree but the remaining portion of the shovel only slightly tempered or left entirely soft so as to present a shovel having a hard face plate that extends to the edge, and a comparatively soft shovel that has the back thereof extended beneath the face plate 2 for supporting and holding the same in position. In use the shovel constructed in this manner will wear the soft material away and leave the edge of the hardened face 2 to project a short distance outward, and thus a comparatively sharp edge is maintained at all times and one that will wear much longer than the soft body portion of the shovel. By thus providing a hardened face plate the shovel body may be made much thinner and yet the shovel wear a comparatively long time, as the hardness of the plate 2 will prevent rapid wearing of the edge which is most susceptible to wear. This reducing of the thickness of the body is of great advantage in reducing the cost of production and weight of the shovel and at the same time presents equal advantage to the ordinary shovel with the addition of the extra length of life of the shovel and the presenting of a sharp cutting edge a substantially long time. Also it will be observed that by providing a face plate 2 that extends only approximately a half distance of the shovel and is very thin the shovel will not easily break as the same is not formed of hard steel for its entire thickness, and any tendency of the plate 2 to crack or break will be resisted by the soft back of the body 1 so that by this combination the hard steel face plate lengthens the life of the shovel and presents a thin edge and the soft back prevents any cracking or breaking of the face plate.

In the construction of shovels a block of iron or soft steel is taken and formed into a blank shovel 5 and a block of high grade steel 6 is pressed out into a comparatively thin piece approximately the width of the blank shovel 5 and approximately half the height thereof. The blank shovel 5 and the pressed piece of steel 6 are then placed in contact and after being heated are pressed while hot into a complete shovel as shown in Figs. 1 to 3 inclusive. After having been completely formed the face plate 2 is tempered to the proper degree of hardness. This forms a shovel in which the continuity of the bottom thereof is not interrupted and is formed continuous though of two grades of metal, one of which is adapted to take a high temper and the other to remain comparatively soft.

What we claim is:

1. In a shovel, a body portion of comparatively soft material having approximately its lower half countersunk below the surface of its upper half, and a hardened steel plate secured within the countersunk portion of the lower half, the said hardened plate forming a cutting edge with the said shovel.

2. In a shovel, a body portion formed of comparatively soft material and having its lower inside surface recessed below its inside upper surface to form a shoulder between the two, and a plate provided with a cutting edge set into the lower recessed portion and abutting said shoulder.

3. In a shovel, a body portion formed of comparatively soft material with a raised upper surface and a lower end surface, a thin plate of tempered steel pressed on the lower end surface, the surface of the said thin plate being substantially flush with the said raised upper surface.

In testimony whereof we affix our signatures in presence of two witnesses.

THOMAS NORRIS.
EDWARD J. MARSHALL.

Witnesses:
O. R. HOOD,
ISAAC HAAS.